US010053019B2

(12) United States Patent
Hodgson et al.

(10) Patent No.: US 10,053,019 B2
(45) Date of Patent: Aug. 21, 2018

(54) CONSOLE FOR VEHICLE INTERIOR

(71) Applicant: Shanghai Yanfeng Jinqiao Automotive Trim Systems Co., Ltd., Plymouth, MI (US)

(72) Inventors: Thomas Scott Hodgson, Holland, MI (US); Nicholas T Moelker, Allendale, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 15/229,402

(22) Filed: Aug. 5, 2016

(65) Prior Publication Data
US 2016/0339848 A1    Nov. 24, 2016

Related U.S. Application Data

(63) Continuation of application No. PCT/US2015/015672, filed on Feb. 12, 2015.
(Continued)

(51) Int. Cl.
*B60R 13/00* (2006.01)
*B60R 7/06* (2006.01)
(Continued)

(52) U.S. Cl.
CPC .............. *B60R 7/06* (2013.01); *B60R 11/00* (2013.01); *E05B 1/0038* (2013.01);
(Continued)

(58) Field of Classification Search
CPC . A01C 15/006; A44B 11/2511; B65G 69/008; F16K 11/0743; H01H 9/226;
(Continued)

(56) References Cited

U.S. PATENT DOCUMENTS 4,733,900 A * 3/1988 Fluharty ................ B60N 3/002
108/134
5,265,450 A    11/1993 Doyle
(Continued)

FOREIGN PATENT DOCUMENTS

DE    10036945 A1    2/2002
EP    1916132 A1    4/2008
(Continued)

OTHER PUBLICATIONS

Written Opinion of the International Search Authority dated May 26, 2015 for PCT/US2015/015672.
(Continued)

*Primary Examiner* — Kiran B Patel
(74) *Attorney, Agent, or Firm* — Christopher G. Darrow; Darrow Mustafa PC

(57) ABSTRACT

A component for vehicle interior is disclosed. The component comprises a base, a bin and a cover. The cover is configured to move relative to the base from a closed position to cover the bin to an intermediate position to partially uncover the bin to an open position to uncover the bin. A button is coupled to the cover. The component comprises a link coupled to the cover and a latch. The link is configured to secure the cover to the base and/or release cover from the base at the closed position, the intermediate position and the open position. The latch comprises two arms. The link is configured to translate downward movement of the button into lateral movement of the two arms between an extended position and a retracted position. The two arms engage with the base to secure the cover to the base when the two arms are at the extended position. The two arms disengage with the base to release the cover from the base when the two arms are at the retracted position. Each
(Continued)

of the two arms is coupled to at least one spring to move the one of the arms to the extended position.

20 Claims, 5 Drawing Sheets

Related U.S. Application Data

(60) Provisional application No. 61/939,133, filed on Feb. 12, 2014.

(51) Int. Cl.

| | | |
|---|---|---|
| E05B 65/08 | (2006.01) | |
| E05B 83/30 | (2014.01) | |
| E05B 83/32 | (2014.01) | |
| E05C 9/04 | (2006.01) | |
| E05B 1/00 | (2006.01) | |
| B60R 11/00 | (2006.01) | |
| E05B 77/36 | (2014.01) | |
| E05C 17/60 | (2006.01) | |
| E05B 17/00 | (2006.01) | |

(52) U.S. Cl.
CPC .......... *E05B 65/0876* (2013.01); *E05B 83/30* (2013.01); *E05B 83/32* (2013.01); *E05C 9/046* (2013.01); *B60R 2011/0007* (2013.01); *E05B 17/0037* (2013.01); *E05B 77/36* (2013.01); *E05C 17/60* (2013.01)

(58) Field of Classification Search
CPC ............. A61B 17/06114; G02B 1/041; G11B 23/08735; H01R 13/447; Y10T 137/87217
USPC ....................................................... 296/24.34
See application file for complete search history.

(56) References Cited

U.S. PATENT DOCUMENTS

| | | | | |
|---|---|---|---|---|
| 5,476,283 A * | 12/1995 | Elton | ............. | B60R 7/06 280/752 |
| 5,732,994 A * | 3/1998 | Stancu | ............. | B60N 2/4646 224/400 |
| 5,823,583 A * | 10/1998 | Sandhu | ............. | E05B 83/30 292/165 |
| 5,904,389 A * | 5/1999 | Vaishnav | ............. | B60R 7/06 208/208 R |
| 5,971,461 A * | 10/1999 | Vaishnav | ............. | B60R 7/06 296/37.12 |
| 6,033,015 A * | 3/2000 | Husted | ............. | B60N 2/4686 16/307 |
| 6,120,069 A | 9/2000 | Taranto | | |
| 6,152,512 A * | 11/2000 | Brown | ............. | B60R 7/06 296/37.12 |
| 6,302,437 B1 * | 10/2001 | Marriott | ............. | B60R 21/20 280/728.3 |
| 7,192,070 B2 * | 3/2007 | Radu | ............. | B60N 2/4606 296/1.09 |
| 7,201,434 B1 * | 4/2007 | Michalak | ............. | B60K 37/00 280/752 |
| 7,431,365 B2 * | 10/2008 | Sturt | ............. | B60N 2/4686 224/539 |
| 8,033,582 B2 | 10/2011 | Sawatani et al. | | |
| 8,235,442 B2 * | 8/2012 | Spitler | ............. | B60R 7/04 296/24.34 |
| 8,505,997 B2 * | 8/2013 | Hipshier | ............. | B60N 2/4686 29/91.1 |
| 8,528,956 B1 * | 9/2013 | Winiger | ............. | B60R 7/04 296/24.34 |
| 8,714,613 B1 * | 5/2014 | Gillis | ............. | B60R 7/04 296/24.34 |
| 8,783,739 B2 * | 7/2014 | Hasegawa | ............. | E05C 3/14 292/220 |
| 9,309,701 B2 * | 4/2016 | Jeffries | ............. | B25H 3/02 |
| 9,469,181 B2 * | 10/2016 | Jeffries | ............. | B60J 7/198 |
| 2003/0209956 A1 | 11/2003 | Bae | | |
| 2004/0017088 A1 | 1/2004 | Sawatani et al. | | |
| 2004/0051333 A1 * | 3/2004 | Brown | ............. | B60R 7/06 296/37.12 |
| 2004/0066053 A1 * | 4/2004 | Fero | ............. | B60R 7/06 296/37.8 |
| 2004/0135353 A1 * | 7/2004 | Enders | ............. | B60R 21/206 280/730.1 |
| 2004/0262937 A1 * | 12/2004 | Peck, Jr. | ............. | B60R 7/06 296/37.12 |
| 2005/0116449 A1 * | 6/2005 | Enders | ............. | B60R 21/206 280/730.1 |
| 2005/0134070 A1 * | 6/2005 | Plentis | ............. | B60R 9/02 296/37.1 |
| 2005/0145527 A1 * | 7/2005 | Christensen | ............. | B25H 3/02 206/500 |
| 2006/0055196 A1 | 3/2006 | Yamada | | |
| 2007/0013202 A1 * | 1/2007 | Tompson | ............. | B60R 7/04 296/37.1 |
| 2007/0182145 A1 * | 8/2007 | Penner | ............. | B60R 7/06 280/752 |
| 2007/0182187 A1 * | 8/2007 | Lota | ............. | B60N 3/103 296/37.8 |
| 2007/0182189 A1 * | 8/2007 | Penner | ............. | B60R 7/06 296/37.12 |
| 2007/0246960 A1 * | 10/2007 | VandenHeuvel | ............. | B60R 7/04 296/1.08 |
| 2008/0079279 A1 * | 4/2008 | Spykerman | ............. | B60N 2/4686 296/24.34 |
| 2008/0106110 A1 * | 5/2008 | Miki | ............. | B60R 7/06 296/37.12 |
| 2009/0072565 A1 * | 3/2009 | Mayne, Jr. | ............. | B60N 2/4686 296/24.34 |
| 2010/0026030 A1 * | 2/2010 | Kim | ............. | B60R 7/06 296/37.12 |
| 2010/0109365 A1 * | 5/2010 | Shibata | ............. | B60R 7/06 296/37.12 |
| 2011/0115246 A1 | 5/2011 | Beyer | | |
| 2011/0215605 A1 * | 9/2011 | Spitler | ............. | B60N 3/00 296/24.34 |
| 2011/0215606 A1 * | 9/2011 | Trivedi | ............. | B60N 3/00 296/24.34 |
| 2011/0227359 A1 * | 9/2011 | Fesenmyer | ............. | B60N 2/4606 296/24.34 |
| 2011/0309640 A1 | 12/2011 | Matsubara | | |
| 2012/0043778 A1 * | 2/2012 | Brant | ............. | B60R 7/04 296/24.34 |
| 2012/0267404 A1 * | 10/2012 | Rottinghaus | ............. | B60R 9/065 224/404 |
| 2013/0134729 A1 * | 5/2013 | Zimmerman | ............. | B60R 7/04 296/24.34 |
| 2014/0197657 A1 * | 7/2014 | Gillis | ............. | B60R 7/04 296/37.8 |
| 2014/0361567 A1 * | 12/2014 | Singh | ............. | E05D 7/02 296/37.8 |
| 2015/0035308 A1 * | 2/2015 | Huebner | ............. | B60R 7/04 296/37.8 |
| 2015/0152671 A1 | 6/2015 | Nakasone | | |
| 2015/0191125 A1 * | 7/2015 | Gillis | ............. | B60R 7/04 296/37.8 |
| 2015/0240539 A1 | 8/2015 | Abe | | |
| 2015/0360616 A1 * | 12/2015 | Shami | ............. | B60R 7/06 296/37.8 |
| 2015/0375684 A1 * | 12/2015 | Gillis | ............. | B60R 7/04 296/24.34 |
| 2016/0024821 A1 * | 1/2016 | Aselage | ............. | E05B 83/30 292/32 |
| 2016/0167588 A1 * | 6/2016 | Simon | ............. | B60R 7/06 296/37.12 |
| 2016/0340942 A1 * | 11/2016 | Anderson | ............. | E05B 83/30 |
| 2016/0344221 A1 * | 11/2016 | Kramer | ............. | H02J 7/025 |
| 2017/0050572 A1 * | 2/2017 | Anderson | ............. | B60R 7/06 |

(56) References Cited

U.S. PATENT DOCUMENTS

| | | | |
|---|---|---|---|
| 2017/0144613 A1* | 5/2017 | Catlin | B60R 11/0241 |
| 2017/0159328 A1* | 6/2017 | Roychoudhury | B60R 21/205 |
| 2017/0267134 A1* | 9/2017 | Anderson | B60N 2/4686 |
| 2017/0267184 A1* | 9/2017 | Huebner | B60R 7/06 |
| 2017/0341860 A1* | 11/2017 | Dodds | B65F 1/122 |
| 2017/0349106 A1* | 12/2017 | Zajicek | B60R 11/06 |

FOREIGN PATENT DOCUMENTS

| | | |
|---|---|---|
| FR | 394843 | 10/1908 |
| FR | 2817897 A1 | 6/2002 |
| GB | 2130291 A | 5/1984 |
| JP | 2006076344 A | 3/2006 |
| JP | 2007056613 A | 3/2007 |
| JP | 2012225075 A | 11/2012 |
| WO | 2015120034 A1 | 8/2015 |
| WO | 2015123442 A1 | 8/2015 |

OTHER PUBLICATIONS

International Search Report dated May 13, 2015 for PCT/US2015/015672.

International Search Report dated Sep. 7, 2015 for PCT/US2015/031822.

Written Opinion of the International Searching Authority dated Sep. 17, 2015 for PCT/US2015/031822.

Non-final Office Action from the United States Patent and Trademark Office for U.S. Appl. No. 15/342,323 dated Dec. 21, 2017 (7 pages).

Non-final Office Action from the United States Patent and Trademark Office for U.S. Appl. No. 15/227,920 dated Jan. 16, 2018 (23 pages).

First Search from the State Intellectual Property Office of the People's Republic of China for CN Patent Application No. 2015800194052 dated Apr. 17, 2018 (translated) (1 page).

* cited by examiner

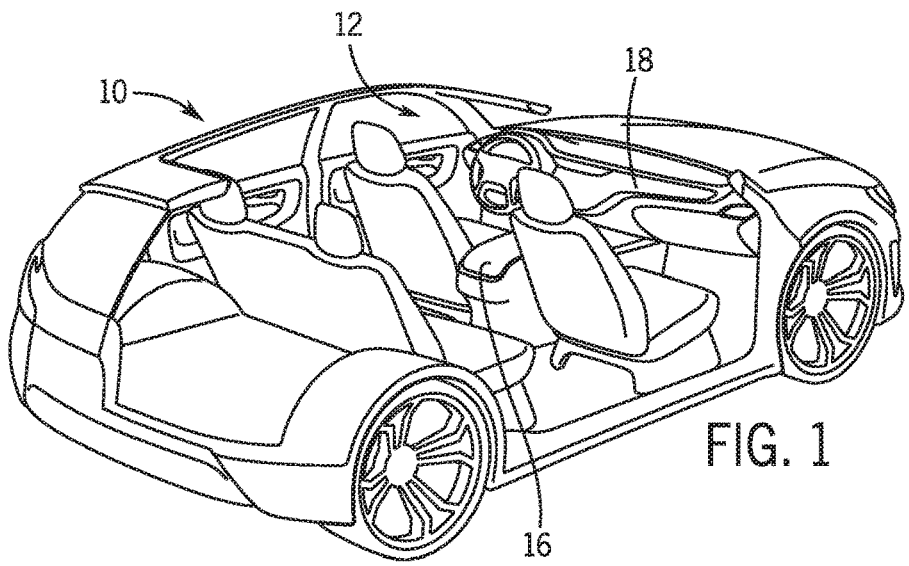
FIG. 1
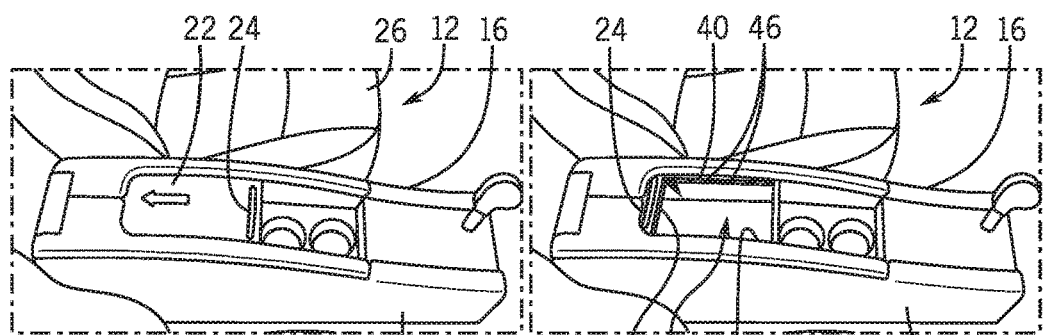
FIG. 2A
FIG. 2B
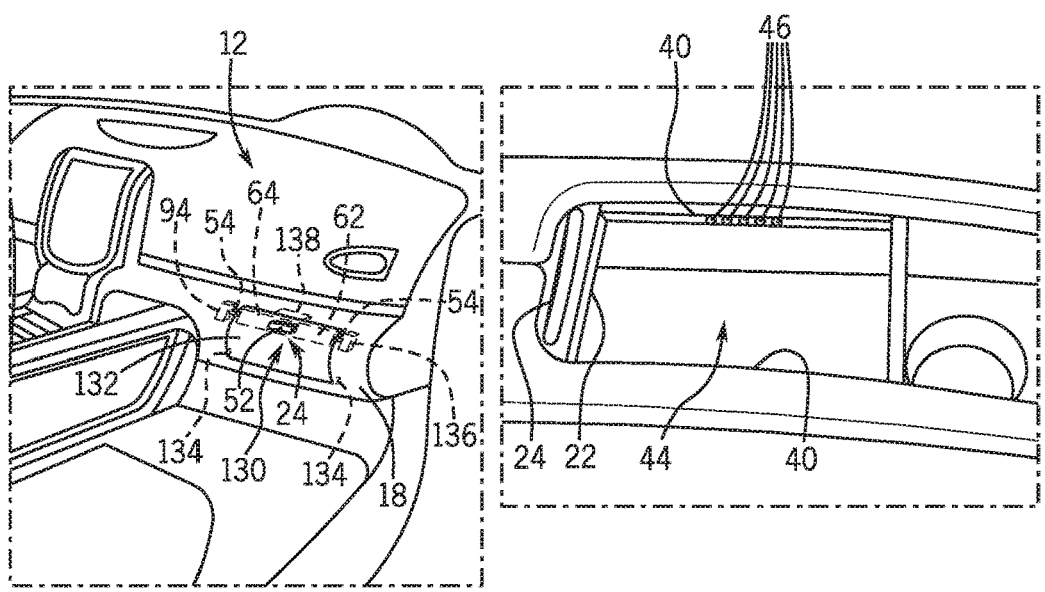
FIG. 3
FIG. 2C

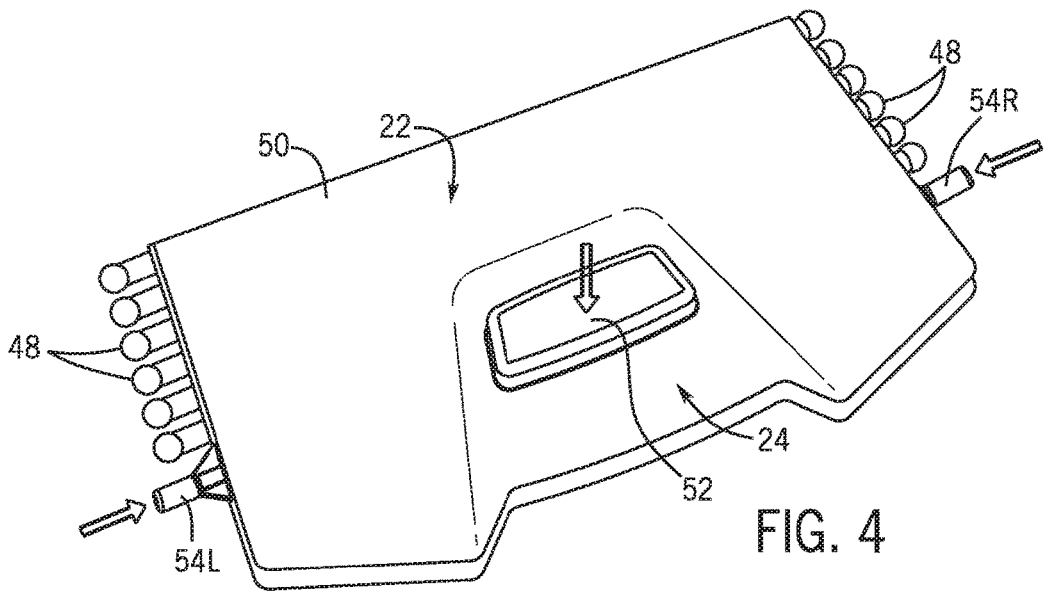
FIG. 4
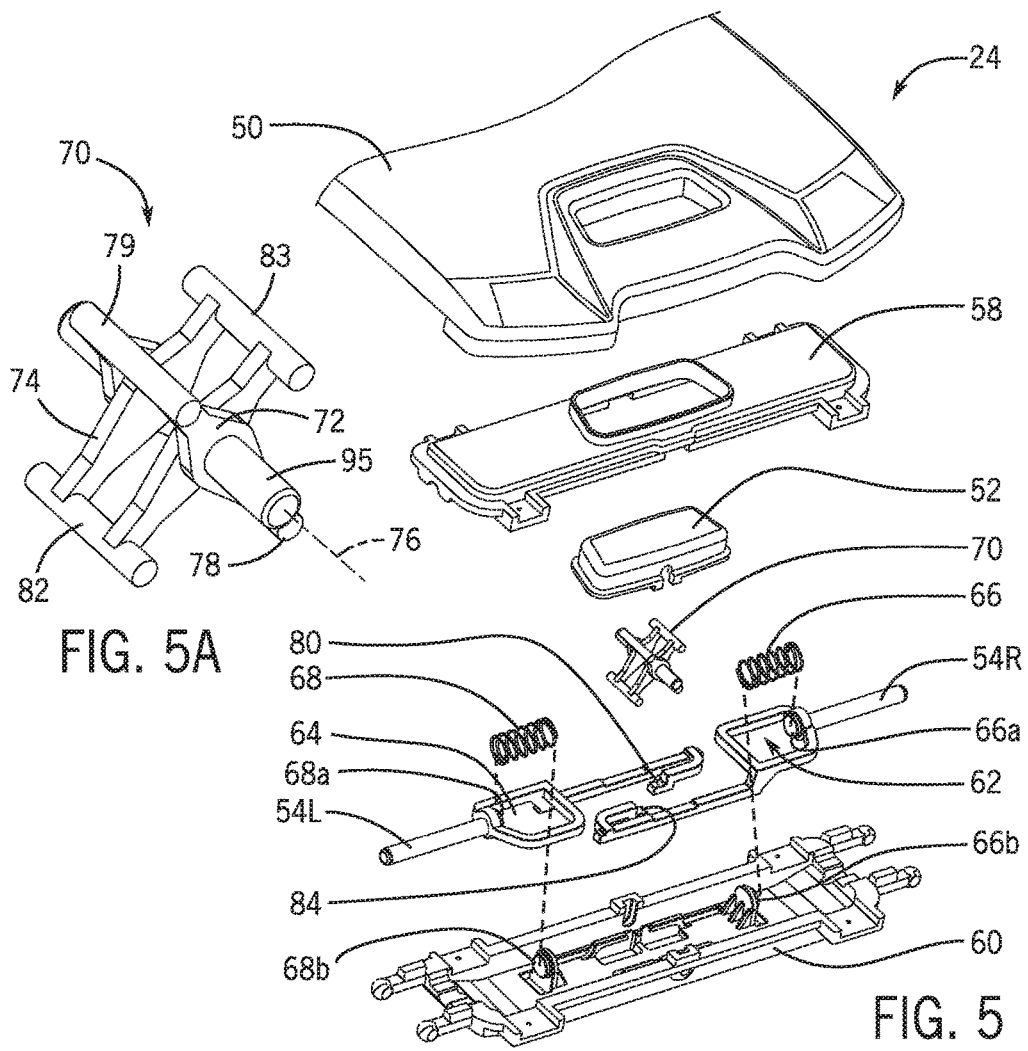
FIG. 5A
FIG. 5

CONSOLE FOR VEHICLE INTERIOR

CROSS REFERENCE TO RELATED APPLICATIONS

The present application is a continuation of International Application No. PCT/US15/15672 titled "LATCH ASSEMBLY FOR A VEHICLE COMPARTMENT DOOR" filed Feb. 12, 2015.

The present application claims priority from and the benefit of and incorporates by reference in entirety of the following applications: (a) International Application No. PCT/US15/15672 titled "LATCH ASSEMBLY FOR A VEHICLE COMPARTMENT DOOR" filed Feb. 12, 2015; (b) U.S. Provisional Patent Application No. 61/939,133 titled "LATCH ASSEMBLY FOR A VEHICLE COMPARTMENT DOOR" filed Feb. 12, 2014.

FIELD

The present invention relates to a console for vehicle interior. The present invention also relates to a vehicle interior component comprising a latch mechanism or assembly.

BACKGROUND

It is known to provide a console for a vehicle interior. It is also known to provide one or more storage compartments within the console for the vehicle interior to store cargo and/or various items. It is also known to provide a storage compartment within an overhead console, an armrest, seats, door panels, and/or an instrument panel, etc. It is also known to provide a door configured to facilitate access of the storage compartment. It is further known to provide a latch mechanism (e.g. latch assembly) to secure the door in an open position and/or a closed position and/or any position between the open position and the closed position.

It would be advantageous to provide a vehicle interior component comprising an improved latch mechanism (e.g. latch assembly) that is simple/easy to operate and/or cost-effective/inexpensive to manufacture and/or assemble.

SUMMARY

The present invention relates to a component for a vehicle interior. The component comprises a base, a bin, a cover configured to move relative to the base from a closed position to cover the bin to an intermediate position to at least partially uncover the bin to an open position to uncover the bin and a button coupled to the cover. The cover is released from the base in response to actuation of the button. The component may also comprise a link coupled to the cover; the link is configured to release the cover from the base in response to actuation of the button when the cover is in the closed position, the intermediate position and the open position. The link may be configured to secure the cover to the base in the closed position, the intermediate position and the open position. The component may also comprise a latch; the latch may comprise a first arm configured to translate in response to actuation of the button and a second arm configured to translate in response to actuation of the button; translation of the first arm and the second arm releases the cover from the base. The button moves in a downward direction when actuated; the latch comprises a link configured to substantially convert the downward movement of the button into movement of the first side arm substantially perpendicular to the downward direction of the button movement. The latch may comprise a link configured to substantially link movement of the second arm and the first arm; the first arm and the second arm may be configured to move from an extended position to a retracted position to disengage the cover from the base. The latch may comprise at least one spring configured to move the first arm and the second arm from the retracted position to the extended position to secure the cover to the base; the first arm may comprise a first pin and the second arm may comprise a second pin; the first pin and the second pin may be configured to engage recesses in the base to secure the cover to the base. The button may be configured to move in a direction perpendicular to a direction of movement of the cover relative to the base.

The present invention also relates to a component for a vehicle interior. The component comprises a base, a bin, a cover configured to move relative to the base from a closed position to cover the bin to an open position to uncover the bin and a link configured to move relative to the cover from an uncompressed position to a compressed position. The cover may be released from the base in response to movement of the link from the uncompressed position to the compressed position; the link may be configured to secure the cover to the base when the link is in the uncompressed position. The cover may comprise a first pin and a second pin; the first pin and the second pin may be configured to engage holes in the base to secure the cover to the base. The link may be configured to move the first pin and the second pin from an extended position to a retracted position to disengage the cover from the base; the cover may comprise a spring; the spring may be configured to bias the link in the uncompressed position. The spring may be compressed in response to compression of the link; the link may be configured to compress in a direction perpendicular to a direction of movement of the cover relative to the base.

The present invention further relates to a component for a vehicle interior. The component comprises a base comprising a first track and a second track, a bin, a cover configured to move along the first track and the second track relative to the base from a closed position to cover the bin to an intermediate position to at least partially uncover the bin to an open position to uncover the bin and a latch coupled to the cover comprising a first pin and a second pin. The first track and the second track may comprise holes configured to receive the first pin and the second pin to selectively block movement of the cover when the cover is in the closed position, the intermediate position and the open position. The first pin may be configured to push against one of the first track and the second track; the second pin may be configured to push against the other of the first track and the second track; the first pin and the second pin may be configured to be extracted from the holes to allow movement of the cover relative to the base.

FIGURES

FIG. 1 is a schematic perspective view of a vehicle according to an exemplary embodiment.

FIGS. 2A and 2B are schematic perspective views of a console for a vehicle interior according to an exemplary embodiment.

FIG. 2C is schematic detail view of the console according to an exemplary embodiment.

FIG. 3 is a schematic perspective view of a vehicle interior with a glove compartment according to an exemplary embodiment.

FIG. 4 is a schematic partial view of a cover for the console according to an exemplary embodiment.

FIG. 5 is a schematic exploded view of the cover for the console according to an exemplary embodiment.

FIG. 5A is a schematic perspective detail view of a scissor link mechanism for the latch assembly according to an exemplary embodiment.

DESCRIPTION

Figure 6A:
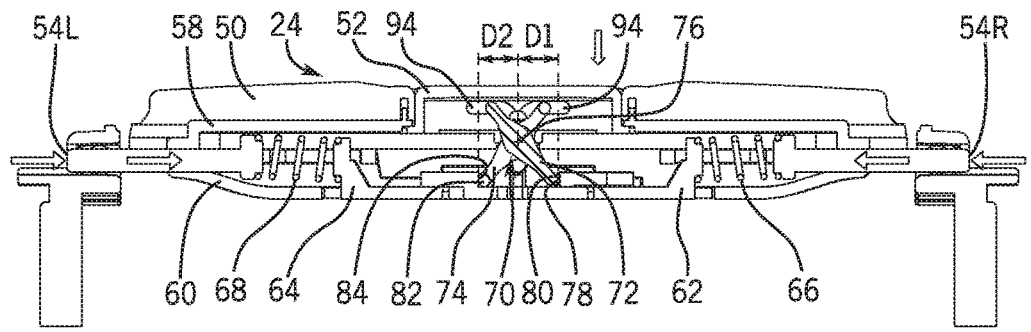
FIGS. 6A and 6B are schematic cross-section views of a latch assembly for the cover according to an exemplary embodiment.

Referring to FIG. 1, a vehicle 10 is shown including an interior 12 with a console shown as a center console 16 and a dashboard or instrument panel 18 according to an exemplary embodiment.

As shown schematically in FIGS. 2A and 2B, vehicle interior 12 comprises a console shown as center console 16; center console 16 comprises a base 36; base 36 provides a storage compartment 44. Center console 16 comprises a door shown as a tambour door 22 (e.g. sliding door); tambour door 22 facilitates access to a storage compartment (e.g. by movement between an open position and a closed position) according to an exemplary embodiment. As shown schematically in FIG. 2A, tambour door 22 is at a closed position; tambour door 22 covers storage compartment 44. As shown schematically in FIG. 2B, tambour door 22 is at an open position; a storage compartment 44 is exposed (e.g. open to access). As shown schematically in FIG. 2B, center console 16 provides a track 40; track 40 is configured to facilitate or guide movement of tambour door 22 between the closed position (e.g. FIG. 2A) and the open position (e.g. FIG. 2B). As shown schematically in FIGS. 2A and 2B, tambour door 22 provides a latch assembly 24. According to an exemplary embodiment, latch assembly 24 is configured to secure tambour door 22 at various locations between the closed position and the open position. As shown schematically in FIG. 2C, track 40 provides holes 46; holes 46 are configured for engagement with latch assembly 24 to secure tambour door 22 at various locations (e.g. intermediate positions) between the closed position and the open position according to an exemplary embodiment.

As shown schematically in FIG. 3, a vehicle interior 12 comprises a compartment shown as a glove compartment 130. Glove compartment 130 provides a door 132; door 132 is configured for movement to facilitate access to glove compartment 130. According to an exemplary embodiment, door 132 moves between a closed position and an open position. As shown schematically in FIG. 3, door 132 comprises latch assembly 24; latch assembly 24 is configured to secure door 132 at the closed position.

As shown schematically in FIG. 4, tambour door 22 comprises a cover 50 and a series of parallel ribs 48 coupled to cover 50. According to an exemplary embodiment, the tip of each parallel rib 48 is configured to engage with track 40.

Tambour door 22 provides latch assembly 24. As shown schematically in FIG. 4, latch assembly 24 provides a button 52 and pins 54 at opposing ends of tambour door 22. According to an exemplary embodiment, pins 54 move between an extended position (see FIG. 6A) and a retracted position (see FIG. 6B); button 52 is configured to convert a downward movement in the vertical direction from a vehicle occupant to lateral movements of pins 54 from the extended position to the retracted position. According to an exemplary embodiment, the button is configured to actuate (e.g. operate) a latch (e.g. latch mechanism/assembly) to secure and release door or cover on the opening of the storage compartment.

As shown schematically in FIG. 5, latch assembly 24 comprises an upper housing 58 and a lower housing 60. Latch assembly 24 comprises a link/mechanism shown as a scissor link 70 and a button 52. Latch assembly 24 comprises a set of members shown as a left side arm 64 and a right side arm 62; left side arm 64 provides pin 54; right side arm 62 provides pin 54; left side arm 64 is coupled to a spring 68; right side arm 62 is coupled to a spring 66. As shown schematically in FIG. 5, spring 68 is attached between a mount 68a on left side arm 64 and a mount 68b on lower housing 60; spring 66 is attached between a mount 66a on right side arm 62 and a mount 66b on lower housing 60.

As shown schematically in FIG. 5A, scissor link 70 is generally X-shaped; scissor link 70 comprises a link arm 72 and a link arm 74. Link arm 72 and link arm 74 are coupled together at a center axis 76 by a center pin 95. Link arm 72 provides a lower engagement rod 78 and an upper engagement rod 79; link arm 74 provides a set of members shown as a lower engagement rod 82 and an upper engagement rod 83.

Figure 6B:
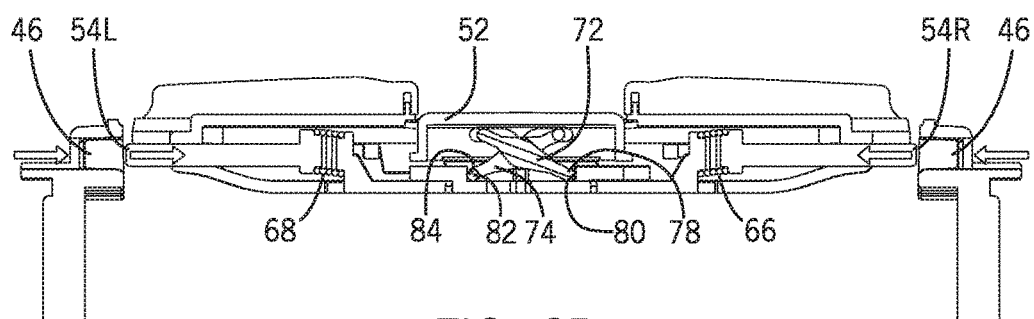

As shown schematically in FIG. 6A, pins 54 are at the extended position; pins 54 engage with holes/recesses 46 on center console 16 to secure tambour door 22 at one of the fixed locations. As shown schematically in FIGS. 6A and 6B, lower engagement rod 78 of link arm 72 engage with a first engagement surface 80 on left side arm 64; lower engagement rod 82 of link arm 74 engage with a second engagement surface 84 on right side arm 62.

As shown schematically in FIG. 6A, pins 54 are at the extended position; button 52 is uncompressed and generally flush with substrate 50 of tambour door 22; spring 68 and spring 66 are generally uncompressed. As shown schematically in FIG. 6B, pins 54 are at the retracted position; button 52 is depressed into a recess on substrate 50; spring 68 and spring 66 are compressed. As shown schematically in FIG. 6B, scissor link 70 is compressed in the vertical direction; lower engagement rod 78 and lower engagement rod 82 are extended outward. Lower engagement rod 78 engages with first engagement surface 80 on left side arm 64 to move left side arm 64 to the right; lower engagement rod 82 engages with second engagement surface 84 on right side arm 62 to move right side arm 62 to the left. As shown schematically in FIG. 6B, pin 54L on left side arm 64 and pin 54R on right side arm 62 are in the retracted position; spring 68 is compressed and is biased to drive left side arm 64 towards the extended position; spring 66 is compressed and is biased to drive right side arm 62 towards the extended position.

Figure 7:
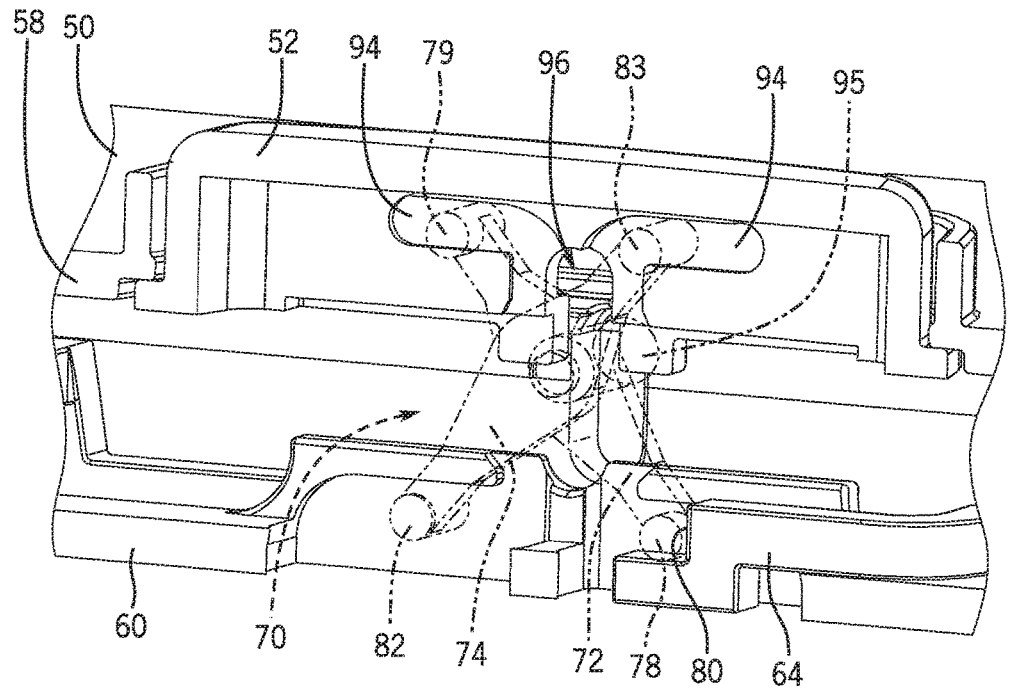
FIG. 7 is schematic cross-section detail view of the latch assembly for the cover according to an exemplary embodiment.

As shown schematically in FIG. 7, scissor link 70 is between upper housing 58 and lower housing 60; button 52 provides slots 94 for upper engagement rod 79 of first link arm 72 and upper engagement rod 83 to slide in. As shown schematically in FIG. 7, scissor link 70 rotate around center pin 95; center pin 95 travels in a track shown as vertical track 96 (e.g. vertically up or down). According to an exemplary embodiment, vertical track 96 is intended to restrict lateral movement of center pin 95 of scissor link 70; the distances traveled by lower engagement rod 78 on link arm 72 and lower engagement rod 82 on link arm 74 are generally equal as button 52 moves to the depressed position. According to an exemplary embodiment, the distance between the extended position and the retracted position of pin 54L on left side arm 64 is generally equal to the distance traveled by lower engagement rod 78 of link arm 72 as button 52 moves from the un-depressed position to the depressed position; the distance between the extended position and the retracted position of pin 54R on right side arm 62 is generally equal to the distance traveled by lower engagement rod 82 of link arm 74 as button 52 moves from the un-depressed position to the depressed position.

Figure 8:
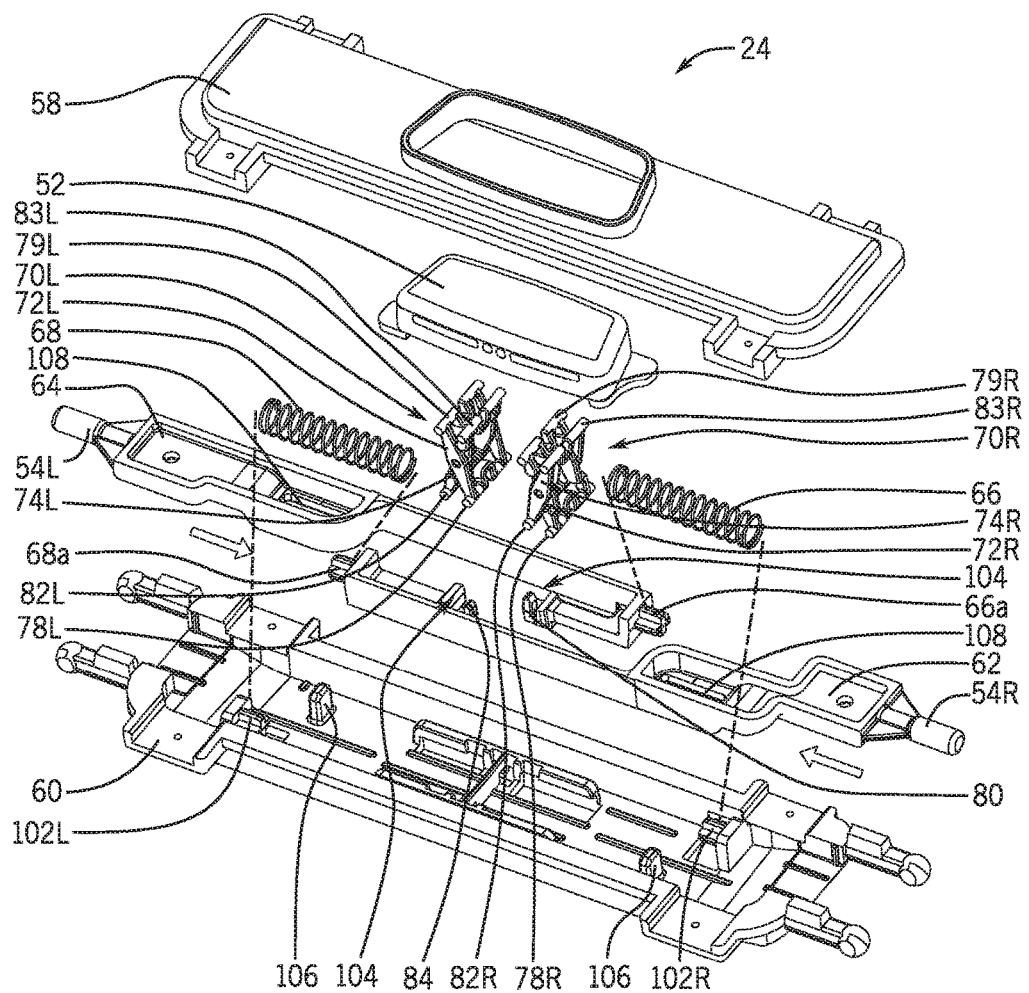
FIG. 8 is a schematic exploded view of a latch assembly for a cover according to an exemplary embodiment.

As shown schematically in FIG. 8, latch assembly 24 comprises an upper housing 58 and a lower housing 60. Latch assembly 24 comprises a left scissor link 70L, a right scissor link 70R and button 52. Latch assembly 24 comprises a left side arm 64 and a right side arm 62; left side arm 64 provides a pin 54L; right side arm 62 provides a pin 54L; left side arm 64 is coupled to a spring 68; right side arm 62 is coupled to a spring 66. As shown schematically in FIG. 8, spring 68 is attached between a mount 68a on left side arm 64 and a mount 102L on lower housing 60; spring 66 is attached between a mount 66a on right side arm 62 and a mount 102R on lower housing 60. As shown schematically in FIG. 8, scissor link 70L and scissor link 70R are generally X-shaped. According to an exemplary embodiment, the range of lateral movement for left side arm 64 and right side arm 62 can be extended with additional scissor links.

Figure 9:
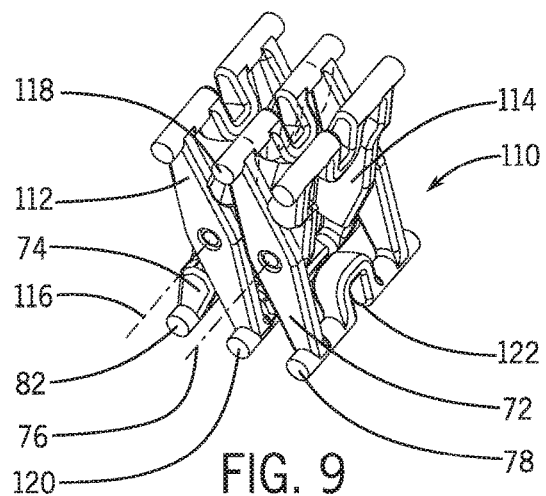
FIG. 9 is a schematic perspective detail view of a scissor link mechanism for the latch assembly according to an exemplary embodiment.

As shown schematically in FIG. 9, scissor link 70L and scissor link 70R may be replaced with a compound scissor link 110. As shown schematically in FIG. 9, in addition of link arm 72 and link arm 74, compound scissor link 110 comprises an additionally link arm 112 and an additionally link arm 114. Link arm 72 and link arm 114 forms a first X-shaped scissor link within compound scissor link 110; link arm 74 and link arm 112 forms a second X-shaped scissor link within compound scissor link 110. The first scissor link and the second scissor link share a joint lower engagement rod 120 and a joint upper engagement rod 118. As shown schematically in FIG. 9, upper engagement rod 118 and lower engagement rod 120 are in the middle of compound scissor link 110. According to an exemplary embodiment, the lateral movement of upper engagement rod 118 and lower engagement rod 120 are restricted to ensure the distances traveled by left side arm 64 and right side arm 62 are generally equal. As shown schematically in FIG. 9, each engagement rod provides a U-shaped element 122 in between of the tips of the engagement rod. According to an exemplary embodiment, U-shaped element 122 is flexible; U-shaped element 122 is configured to facilitate installation of compound scissor link 110; the opposing tips of each engagement rod can be pinched together during installation to button 52.

Figure 10A:
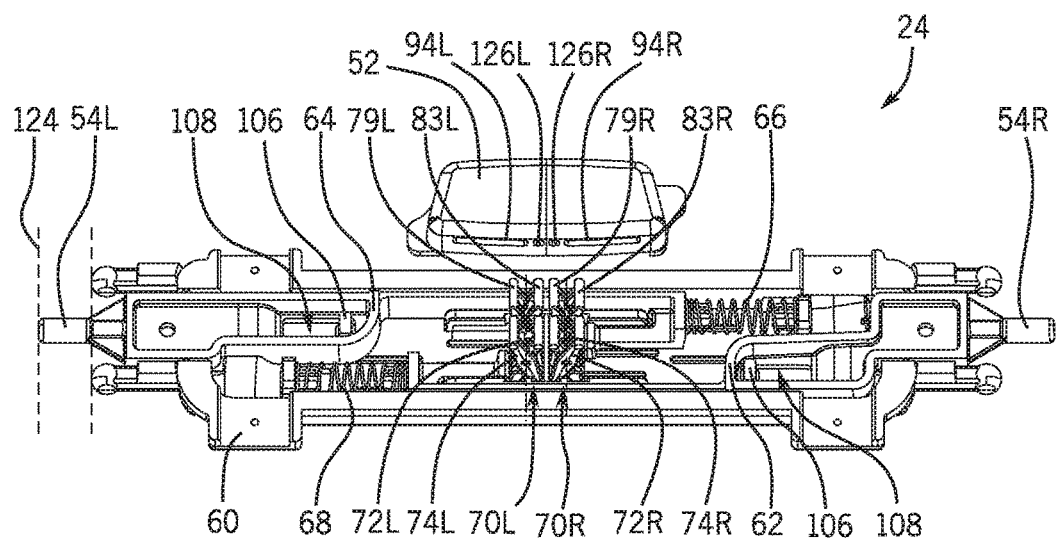
FIGS. 10A and 10B are schematic perspective views of the latch assembly for the cover according to an exemplary embodiment.
Figure 10B:
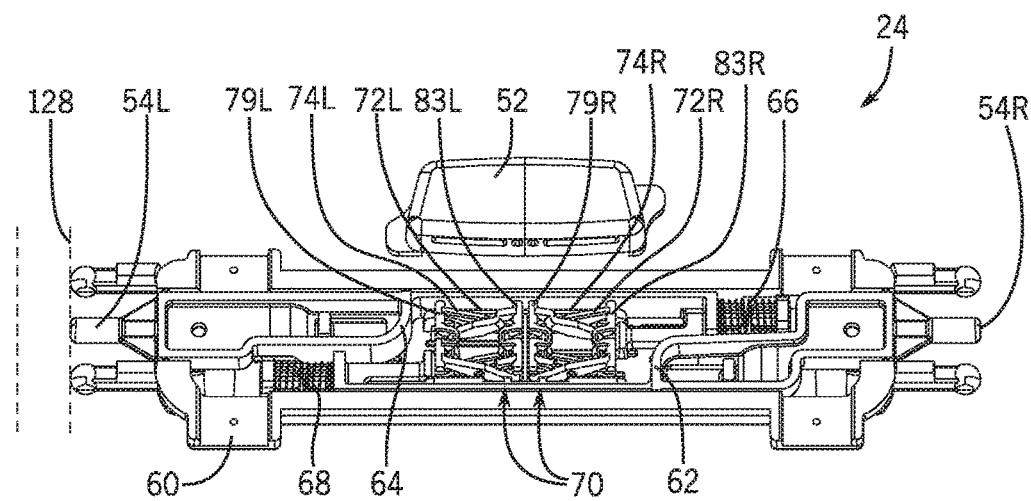

As shown schematically in FIGS. 8, 10A and 10B, latch assembly 24 comprises upper housing 58 and lower housing 60; left side arm 64 and right side arm 62 move between the extended position (see FIG. 10A) and the retracted position (see FIG. 10B). As shown schematically in FIGS. 10A and 10B, left side arm 64 is connected to lower housing 60 by spring 66; right side arm 62 is connected to lower housing 60 by spring 68. According to an exemplary embodiment, spring 66 is compressed when left side arm 64 is in the retracted position; spring 68 is compressed when right side arm 62 is in the retracted position.

As shown schematically in FIGS. 10A and 10B, latch assembly 24 comprises two scissor links (i.e. scissor link 70L and scissor link 70R); button 52 provides two opposing holes 126 and two opposing slots 94. According to an exemplary embodiment, upper engagement rod 83L of left scissor link 70L is attached to the left hole 126; upper engagement rod 79R of right scissor link 70R is attached to right hole 126; upper engagement rod 79L of left scissor link 70L is attached to the left slot 94 and is configured to slide within the left slot 94; upper engagement rod 83R of right scissor link 70R is attached to the right slot 94 and is configured to slide within the right slot 94.

According to an exemplary embodiment, when button 52 is depressed, scissor link 70L and scissor link 70R are extended outward in the lateral direction. Upper engagement rod 83L and upper engagement rod 79R are attached to holes 126; upper engagement rod 83L and upper engagement rod 79R move generally in the vertical direction. According to an exemplary embodiment, scissor link 70L and scissor link 70R facilitate movement of left side arm 64 and right side arm 62 from the extended position to the retracted position; scissor link 70L and scissor link 70R are configured to translate downward movement of button 52 into lateral movement of left side arm 64 and right side arm 62. According to an exemplary embodiment, when scissor link 70L is compressed vertically, right side arm 62 is moved from the extended position to the retracted position; spring 68 is compressed between right side arm 62 and lower housing 60; when scissor link 70R is compressed vertically, left side arm 64 is moved from the extended position to the retracted position; spring 66 is compressed between left side arm 62 and lower housing 60.

According to an exemplary embodiment, when one of the side arms (e.g. left side arm 64 or right side arm 62) is moved to the retracted position, the other side arm (e.g. left side arm 64 or right side arm 62) is moved to the retracted position. According to an exemplary embodiment, when left side arm 64 is moved to the retracted position, spring 66 is compressed between left side arm 64 and lower housing 60; right scissor link 70R is compressed in the vertical direction; upper engagement rod 83R slides along right slot 94 on button 52; upper engagement rod 79R moves downward in the vertical direction and pulls button 52 downward into the depressed position; button 52 compresses left scissor link 70L downward in the vertical direction; scissor link 70L extends outward in the lateral direction; scissor link 70L moves right side arm 62 from the extended position to the retracted position; spring 68 is compressed between right side arm 62 and lower housing 60.

As shown schematically in FIG. 10A, pins 54 are at the extended position; pins 54 engage with holes/recesses 46 on center console 16 to secure tambour door 22 at one of the fixed locations according to an exemplary embodiment. As shown schematically in FIGS. 10A and 10B, lower engagement rod 78L of link arm 72R engage with a first engagement surface 80 on left side arm 64; lower engagement rod 82L of link arm 74L engage with a second engagement surface 84 on right side arm 62.

As shown schematically in FIG. 10A, pins 54 are at the extended position; spring 68 and spring 66 are generally uncompressed. According to an exemplary embodiment, button 52 is uncompressed and generally flush with substrate 50 of tambour door 22. As shown schematically in FIG. 10B, pins 54 are at the retracted position; spring 68 and spring 66 are compressed. As shown schematically in FIG. 10B, scissor link 70L and scissor link R are compressed in the vertical direction; lower engagement rod 78R and lower engagement rod 82L are extended outward. Lower engagement rod 78R engage with first engagement surface 80 on left side arm 64 to move left side arm 64 to the right; lower engagement rod 82L engage with second engagement surface 84 on right side arm 62 to move right side arm 62 to the left. As shown schematically in FIG. 10B, pin 54L on left side arm 64 and pin 54R on right side arm 62 are in the retracted position; spring 68 is compressed and is biased to drive left side arm 64 towards the extended position; spring 66 is compressed and is biased to drive right side arm 62 towards the extended position.

Exemplary Embodiments

As shown schematically in FIG. 1, a vehicle 10 includes an interior 12 having seats 14, a console shown as a center console 16 and a dash 18. According to an exemplary embodiment, center console 16, dash 18, and/or other areas within interior 12 may include a storage compartment having a latch assembly that selectively secures a door of the storage compartment. According to an exemplary embodiment, the storage compartment may employ a tambour door having a latch assembly that secures the tambour door in one or more locations. According to an exemplary embodiment, pins from the latch assembly may be configured to engage a track system provided within the storage compartment at one or more securing points, enabling the tambour door to be secured along an opening of the storage compartment. The latch assembly may include a button configured to facilitate movement of the pins between an extended position and a retracted position (i.e. out of the securing points as the button is depressed). According to an exemplary embodiment, removal of the pins from the securing points enables movement of the tambour door. According to an exemplary embodiment, dash 18 may include a glove compartment; the glove compartment may include a door; the door may be held in a closed position by a latch assembly.

According to an exemplary embodiment, a compartment may include a number of methods of securing the covers and/or doors to the compartment in a desired position; the compartments may suffer from accidental unlatching during use. According to an exemplary embodiment, when an occupant of the vehicle 10 rests an arm or an elbow on the center console 16, the center console compartment may accidentally open. According to an exemplary embodiment, the door may include a latching mechanism that forms a bump above the surface of the door. According to an exemplary embodiment, a latch assembly may increase aesthetic appeal and mechanical functionality through a low-profile mechanical apparatus.

As shown schematically in FIG. 2A, center console 16 includes a storage compartment 44 enclosed by a tambour door 22 having a latch assembly 24. Center console 16 is coupled to a floor of interior 12 between seats 26. As shown schematically in FIG. 2A, center console 16 is configured to provide storage compartment 44 and an armrest for vehicle occupants; center console 16 includes a base 36 which forms the main body of center console 16. As shown schematically in FIG. 2A, center console 16 includes a door 22 configured to transition between an open position and a closed position; door 22 includes a latch assembly 24 that may enable a vehicle occupant to secure door 22 in a number of positions between the open position and the closed position. According to an exemplary embodiment, sliding the door 22 toward the open position exposes an interior of storage compartment 44 located within center console 16. According to an exemplary embodiment, door 22 is a tambour door having a series of substantially parallel ribs coupled to a substrate. See FIG. 4. The ribs are configured to engage a track within center console 16 while the substrate enables door 22 to flex and to accommodate the contours of the opening of storage compartment 44. According to an exemplary embodiment, tambour doors may be positioned throughout interior 12 of vehicle 10 (e.g. within an overhead console, door panel, instrument panel, dash, etc.) According to an exemplary embodiment, the latch assembly may be included in other interior trim components. According to an exemplary embodiment, the latch assembly may enable a vehicle occupant to retain the door (e.g. tambour door 22) in a desired position over the storage compartment without accidental unlatching.

As shown schematically in FIG. 2B, tambour door 22 is in an open position; the side walls of center console 16 include rails or tracks 40 configured to facilitate movement of tambour door 22 between the closed position and the open position. According to an exemplary embodiment, tracks 40 may include a C-shaped cross section, and may be coupled to the side walls of center console 16 or integrally formed within the side walls of center console 16. The ribs of tambour door 22 include protrusions which engage tracks 40 and support tambour door 22; the attached substrate enables tambour door 22 to flex and accommodate the contours of tracks 40. As shown schematically in FIG. 2B, an interior of the storage compartment is exposed when tambour door 22 is at the open position.

According to an exemplary embodiment, a vehicle occupant may close tambour door 22 by grasping latch assembly 24 or handle to move tambour door 22 toward the closed position. As the vehicle occupant pulls tambour door 22, side pins of latch assembly 24 may engage securing holes 46 (e.g. recesses) positioned along tracks 40. Each securing hole 46 in one track 40 has a corresponding securing hole on the opposite track 40 (e.g. the securing holes are aligned) so that the side pins on tambour door 22 may both enter the opposing securing holes 46 at the same time. According to an exemplary embodiment, the side pins of the latch assembly 24 move in and out together; the pins remain secured in the securing holes 46 until both pins are extracted (which reduces wear on the latch assembly 24 and reduces the possibility of accidentally unlatching and opening tambour door 22). When tambour door 22 is in the closed position, the exterior surface of tambour door 22 may provide a suitable surface for writing, storing small items and/or to be used as an armrest.

As shown schematically in FIG. 3, a glove compartment 130 may use a latch assembly. According to an exemplary embodiment, glove compartment 130 includes a door 132 that may slide open along a track; door 132 may be a solid panel door configured to hold a contour of dash 18; door 132 may be installed in other areas of the vehicle interior. According to an exemplary embodiment, the door 132 may spring open, rotating down with a hinge 134 at the bottom of compartment 130. According to an exemplary embodiment, latch assembly 24 may include right side arm 62, left side arm 64 and button 52; side pins 54 are connected to side arm 62 and side arm 64 and are received by receptacles 136 that lock compartment 130 closed. When button 52 is depressed, side arm 62 and side arm 64 pull side pins 54 out of receptacles 136 and compartment 130 comes open. To assist in opening compartment 130, a bumper 138 may be installed behind the latch assembly 24. According to an exemplary embodiment, bumper 138 may be compressed while compartment 130 is forced closed, pushing against compartment 130. According to an exemplary embodiment, when button 52 is pushed and side pins 54 exit receptacles 136, bumper 138 pushes compartment 130 away from dash 18; latch assembly 24 may be installed within dash 18 with the receptacles installed within the panel door 132.

According to an exemplary embodiment, tambour door 22 includes multiple substantially parallel ribs 48 coupled to a substrate 50; ribs 48 are configured to engage tracks 40 of center console 16 to support tambour door 22 and to facilitate movement of tambour door 22 between the closed position and the open position. Ribs 48 are coupled to the interior surface of substrate 50 to form a unitary structure. According to an exemplary embodiment, tambour door 22 may flex in a direction perpendicular to the orientation of the substantially parallel ribs 48 to enable tambour door 22 to match the contours of a curved storage compartment opening.

According to an exemplary embodiment, tambour door 22 includes a latch assembly 24 configured to selectively block movement of the door 22 at a desired position (e.g. the open position, the closed position, partly closed positions, etc.). As shown schematically in FIG. 4, latch assembly 24 includes a button 52. According to an exemplary embodiment, other components (e.g. knobs, recesses, etc.) may be used to control movement of the tambour door. As shown schematically in FIG. 4, latch assembly 24 includes side pins 54 configured to engage securing holes 46 in tracks 40. See FIG. 2C. According to an exemplary embodiment, side pins 54 are configured to apply generally equal force to the sides of tracks 40 when latch assembly 24 is used in conjunction with tambour door 22. When side pins 54 are not secured within securing holes 46 side pins 54 push against track 40 to center latch assembly 24 and tambour door 22 laterally within track 40. According to an exemplary embodiment, side pins 54 are intended to keep the tambour door 22 from rattling and to reduce noise and wear on tambour door 22; button 52 is constructed to be flush with substrate 50 when button 52 is in a raised position. According to an exemplary embodiment, a vehicle occupant may rest an arm or an elbow on substrate 50 of tambour door 22 without accidentally pressing button 52 and opening tambour door 22. According to an exemplary embodiment, the aesthetic appearance may be enhanced. Button 52 may be configured to receive a force from a vehicle occupant to release the side pins 54. As shown schematically in FIG. 4, button 52 is capable of receiving a downward force perpendicular to the surface of substrate 50; when button 52 moves in the downward direction, side pins 54 retract from the recesses in track 40 to facilitate movement of tambour door 22.

As shown schematically in FIG. 5, latch assembly 24 includes an upper housing 58, a lower housing 60 and a latching mechanism installed between upper housing 58 and lower housing 60. A right side arm 62 and a left side arm 64 are disposed between upper housing 58 and lower housing 60. A right spring 66 and a left spring 68 are configured to push side arm 62 and side arm 64 towards an extended position. Latch assembly 24 includes a scissor link 70 to convert downward movement of button 52 into laterally inward movement of side arm 62 and side arm 64; the movement of right side arm 62 is substantially equal to the movement of the left side arm 64 according to an exemplary embodiment. Latch assembly 24 includes the button 52 to receive a depressing force from a vehicle occupant. As shown schematically in FIG. 4, the button is surrounded by substrate 50 of door 22.

As shown schematically in FIG. 6A, latch assembly 24 includes button 52 and side pins 54 which engage respective recesses; upper housing 58 is coupled to substrate 50; button 52 is flush with substrate 50 and moves below the level of substrate 50 when a vehicle occupant applies a depressing force to button 52. As shown schematically in FIG. 6A, button 52 is in the raised position; side pins 54 are extended outward to the left and the right. Each side pin 54 is an element of either right side arm 62 or left side arm 64. Side arms 62 and side arm 64 respond to movement of button 52 in the downward direction due to interaction with the scissor link 70. According to an exemplary embodiment, scissor link 70 ensures the movement of right side arm 62 and left side arm 64 are substantially equal. As shown schematically in FIG. 6A, scissor link 70 includes link arm 72 and link arm 74 which form an X shape through a center axis 76 of the scissor link 70. The first link arm 72 includes a first engagement rod 78 at a first end that engages the left side arm 64 at a first engagement surface 80. The second link arm 74 includes a second engagement rod 82 at a first end that engages the right side arm 62 at a second engagement surface 84. The second link arm 74 engages button 52 at a third engagement rod 83. During compression of button 52, link arm 72 and link arm 74 move from an upright position to a recumbent position. See FIG. 6B. As shown schematically in FIG. 6A, first link arm 72 and second link arm 74 are positioned at approximately 90 degrees with respect to one another and approximately 45 degrees with respect to lower housing 60. In the uncompressed position, first engagement rod 78 of scissor link 70 and first engagement surface 80 of left side arm 64 are positioned a distance D1 from the axis 76 of the scissor link 70; second engagement rod 82 and second engagement surface 84 are positioned a distance D2 from axis 76. According to an exemplary embodiment, distance D1 and distance D2 appear approximately equal (in other embodiments the distances may be different).

As the button 52 is depressed, upper engagement rod 79 of link arm 72 and upper engagement rod 83 of link arm 74 engage with button 52 to put link arm 72 and link arm 74 to transition toward the recumbent position (i.e. the angle with respect to the lower housing 60 is reduced). The movement of link arm 72 relative to lower housing 60 increases the distance D1 between the first engagement rod 78 and the axis 76 to drive left side arm 64 to the right which pulls the side pin 54 on left side arm 64 out of the respective recess; the second engagement rod 82 drives the second engagement surface 84 and the right side arm 62 to the left and pulls the side pin 54 on right side arm 62 out of the respective recess. As shown schematically in FIGS. 6A, 6B and 7, button 52, upper housing 58, and/or lower housing 60 may include slots 94 to guide the movement of link arm 72 and link arm 74 of scissor link 70. According to an exemplary embodiment, the slots 94 may reduce and/or block asymmetrical movement of button 52; as the button 52 is depressed, the first link arm 72 and the second link arm 74 slide outward in the corresponding slots 94 so that button 52 remains horizontal relative to substrate 50 and upper housing 58.

As shown schematically in FIG. 7, the latch assembly comprises scissor link 70, first link arm 72, second link arm 74, upper housing 58, lower housing 60 and button 52. Engagement rod 78 of the first link arm 72 is engaging surface 80 of left side arm 64. As shown schematically in FIG. 7, scissor link 70 includes a center pin 95 at axis 76; link arm 72 and link arm 74 rotate around a center pin 95; center pin 95 is mounted within a center-pin track 96 formed within the lower housing 60 and/or button 52. Center-pin track 96 enables center pin 95 to translate in the vertical direction and to constrain movement in the horizontal direction. The constraint of movement in the horizontal/lateral direction by center-pin track 96 ensures that as link arm 72 and link arm 74 rotate around center pin 95; the lateral movement of the engagement surface 80 and engagement surface 84 is substantially equal; the lateral movement of right side arm 62 is substantially equal to the lateral movement of left side arm 64 as button 52 is depressed.

As shown schematically in FIG. 8, latch assembly 24 includes upper housing 58, lower housing 60 and additional parts that may be installed between upper housing 58 and lower housing 60. Right side arm 62 may be installed with a right spring 66; left side arm 64 may be installed with a left spring 68; side arm 62 and side arm 64 are extended away from the middle. Spring 66 and spring 68 are installed on spring mounts 102 on each of side arm 62 and side arm 64 and in lower housing 60. The spring mount 102 ensure that spring 66 and spring 68 do not slide out of position during depression of button 52. Latch assembly 24 includes two scissor links 70 that ensure that the movement of right side arm 62 is substantially equal to the movement of left side arm 64. Each scissor link 70 includes first link arm 72 and second link arm 74, as well as first engagement rod 78 and second engagement rod 82. An additional scissor link 70 within latch assembly 24 provides a greater range of movement of side pins 54. According to an exemplary embodiment, the distance traveled by right arm 62 and left arm 64 may be doubled as button 52 receives a depressing force.

As shown schematically in FIG. 8, side arm 62 includes a cup 104 at engagement surface 80; side arm 64 includes a cup 104 at engagement surface 84. According to an exemplary embodiment, cup 104 captures the respective engagement rod; each scissor link 70 is coupled to the respective side arm. Movement of one side arm drives movement of scissor links 70, which subsequently drives movement of the other side arm (e.g. side pin 54 of right side arm 62 is externally forced to the left, cup 104 of right side arm 62 will pull on scissor link 70 causing scissor link 70 to move toward the recumbent position. Due to the connection between the engagement rods at the second end of the link arms with the slot in the button, transitioning one link toward the upright position drives the other link toward the upright position (e.g. driving left side arm 64 to the right). According to an exemplary embodiment, the linking of scissor link 70 via button 52 may enable latch assembly 24 to employ a single spring. The single spring may be installed on either the right side or the left side and the restorative force of the spring is transferred through side arm 62 and side arm 64 to cup 104 to scissor links 70 and to the other side arm (e.g. side arm 62 or side arm 64). According to an exemplary embodiment, the movement of each side arm be guided by slide guides 106 in lower housing 60 that may be installed through slide-guide slots 108. See also FIGS. 10 and 11.

According to an exemplary embodiment, two scissor links 70 shown in FIG. 8 may be coupled to one another to form a compound scissor link 110 having four link arms (e.g. first link arm 72, second link arm 74, third link arm 116 and fourth link arm 118); the compound scissor link 110 includes first engagement rod 78 and second engagement rod 82. Compound scissor link 110 includes a top hinge 118 and a bottom hinge 120 that connect the third link arm 112 and the fourth link arm 114. An additional axis 116 is formed between second link arm 76 and third link arm 112; additional link arms may be added to the compound scissor link 110 with additional hinges and axes. Compound scissor link 110 includes an upright position in which engagement rods 78 and engagement rods 82 are close together and link arm 72, link arm 74, link arm 112 and link arm 114 are substantially upright. Compound scissor link 110 may be expanded to a recumbent position in which engagement rod 78 and engagement rod 82 in the upper half of compound scissor link 110 are separated from one another and link arm 72, link arm 74, link arm 112 and link arm 114 are substantially reclined. The downward movement of the button 52 can be converted into horizontal movement of the side arms (i.e. right and left) to pull side pins 54 from the recesses.

As shown schematically in FIG. 9, compound scissor link 110 may include a flex U element 122; flex U element 122 enables flexing of engagement rods 120 during installation into upper housing 58, lower housing 60, button 52, right side arm 62 and left side arm 64. Flex U element 122 may be used in scissor link 70; flex U element 122 enables the engagement rod 120 of one of link arm 72, link arm 74, link arm 112 and/or link arm 114 may be squeezed together in order to snap engagement rod 120 into the proper location within upper housing 58, lower housing 60, button 52, right side arm 62 and/or left side arm 64. According to an exemplary embodiment, scissor link 70 or compound scissor link 110 may not include flex U element 122; a different method of installing scissor link 70 or compound scissor link 110 may be used.

As shown schematically in FIG. 10, in the uncompressed position scissor links 70 are substantially upright and engagement rod 78 and engagement rod 82 are positioned close together. In the uncompressed position, spring 66 and spring 68 is uncompressed and side pins 54 are extended into a locking position 124. As shown schematically in FIG. 10, scissor link 70 does not include center pin 95 along axis 76 between link arm 72 and link arm 74; engagement rod 78 and engagement rod 82 are engaged with fixed-position holes 126 in button 52. Fixed-position holes 126 may be installed in upper housing 58 and/or lower housing 60; fixed-position holes 126 hold certain engagement rods in a desired position to control movement of the engagement rods coupled to the engagement surfaces. As shown schematically in FIG. 10, the engagement rods close to the center of button 52 are installed in fixed-position holes 126 while the engagement rods away from the center of button 52 slide in response to depression of button 52.

As shown schematically in FIG. 11, in the compressed position scissor links 70 are in the recumbent position and engagement rod 78 and engagement rod 82 are separated from one another. In the compressed position, spring 66 and spring 68 are compressed and side pins 54 are retracted into an open position 128.

While only certain features and embodiments of the invention have been illustrated and described, many modifications and changes may occur to those skilled in the art (e.g. variations in sizes, dimensions, structures, shapes and proportions of the various elements, values of parameters (e.g. temperatures, pressures, etc.), mounting arrangements, use of materials, colors, orientations, etc.) without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e. those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
    (a) a base;
    (b) a bin;
    (c) a cover configured to move relative to the base (1) from a closed position to cover the bin (2) to an intermediate position to at least partially uncover the bin (3) to an open position to uncover the bin; and
    (d) a button coupled to the cover;
wherein the cover is released from the base in response to actuation of the button.

2. The component of claim 1 further comprising a link coupled to the cover wherein the link is configured to release the cover from the base in response to actuation of the button when the cover is in the closed position, the intermediate position and the open position.

3. The component of claim 2 wherein the link is configured to secure the cover to the base in the closed position, the intermediate position and the open position.

4. The component of claim 1 further comprising a latch wherein the latch comprises a first arm configured to translate in response to actuation of the button and a second arm configured to translate in response to actuation of the button; wherein translation of the first arm and the second arm releases the cover from the base.

5. The component of claim 4 wherein the button moves in a downward direction when actuated and wherein the latch comprises a link configured to substantially convert the downward movement of the button into movement of the first side arm substantially perpendicular to the downward direction of the button movement.

6. The component of claim 4 wherein the latch comprises a link configured to substantially link movement of the second arm and the first arm.

7. The component of claim 4 wherein the first arm and the second arm are configured to move from an extended position to a retracted position to disengage the cover from the base.

8. The component of claim 7 wherein the latch comprises at least one spring configured to move the first arm and the second arm from the retracted position to the extended position to secure the cover to the base.

9. The component of claim 4 wherein the first arm comprises a first pin and the second arm comprises a second pin and wherein the first pin and the second pin are configured to engage recesses in the base to secure the cover to the base.

10. The component of claim 1 wherein the button is configured to move in a direction perpendicular to a direction of movement of the cover relative to the base.

11. The component of claim 1 further comprising a link configured to move relative to the cover from an uncompressed position to a compressed position; wherein the cover is released from the base in response to movement of the link from the uncompressed position to the compressed position.

12. The component of claim 11 wherein the link is configured to secure the cover to the base when the link is in the uncompressed position.

13. The component of claim 11 wherein the cover comprises a first pin and a second pin and wherein the first pin and the second pin are configured to engage holes in the base to secure the cover to the base.

14. The component of claim 13 wherein the link is configured to move the first pin and the second pin from an extended position to a retracted position to disengage the cover from the base.

15. The component of claim 11 wherein the cover comprises a spring; wherein the spring is configured to bias the link in the uncompressed position.

16. The component of claim 15 wherein the spring is compressed in response to compression of the link.

17. The component of claim 11 wherein the link is configured compress in a direction perpendicular to a direction of movement of the cover relative to the base.

18. The component of claim 1 further comprising a latch comprising a first pin and a second pin; wherein the base comprises a first track and a second track; wherein the first track and the second track comprise holes configured to receive the first pin and the second pin to selectively block movement of the cover when the cover is in the closed position, the intermediate position and the open position.

19. The component of claim 18 wherein the first pin is configured to push against one of the first track and the second track and wherein the second pin is configured to push against the other of the first track and the second track.

20. The component of claim 18 wherein the first pin and the second pin are configured to be withdrawn from a corresponding hole of the holes to allow movement of the cover relative to the base.

* * * * *